United States Patent [19]

Beckman

[11] 4,221,608

[45] Sep. 9, 1980

[54] RUBBER-REINFORCING BLACKS

[75] Inventor: Joseph A. Beckman, Akron, Ohio

[73] Assignee: The Firestone Tire & Rubber Company, Akron, Ohio

[21] Appl. No.: 283,878

[22] Filed: Aug. 25, 1972

[51] Int. Cl.$^2$ ............................ C09C 1/44; C09C 1/56
[52] U.S. Cl. ............................. 106/307; 260/42.14; 423/449
[58] Field of Search ............... 106/307; 423/445, 449; 201/25, 35; 260/42.14

[56] References Cited

U.S. PATENT DOCUMENTS

| | | | |
|---|---|---|---|
| 1,651,733 | 12/1927 | Sheppard et al. | 106/307 |
| 1,986,050 | 1/1935 | Fairley | 106/307 |
| 2,102,741 | 12/1937 | Pickett | 106/307 |
| 2,516,233 | 7/1950 | McKinnis | 106/307 |
| 2,635,057 | 4/1953 | Jordan | 106/307 |
| 3,329,646 | 7/1967 | Gessler | 106/307 |
| 3,404,019 | 10/1968 | Gotshall | 106/307 |
| 3,404,120 | 10/1968 | Gotshall | 106/307 |
| 3,493,532 | 2/1970 | Gotshall | 106/307 |
| 3,573,241 | 3/1971 | Gotshall | 106/307 |
| 3,582,279 | 6/1971 | Beckman et al. | 106/307 |
| 3,622,650 | 11/1971 | Berstein et al. | 106/307 |
| 3,644,131 | 2/1972 | Gotshall | 106/307 |
| 3,772,242 | 11/1973 | Liska et al. | 106/307 |
| 3,823,223 | 7/1974 | Liska et al. | 106/307 |

FOREIGN PATENT DOCUMENTS 854258 11/1952 Fed. Rep. of Germany ........... 106/307

OTHER PUBLICATIONS

Bremner et al., Transactions, I.R.I., Attempt to Produce Carbon Black by Fine Grinding, vol. 24, pp. 35–51, 1948.

Rubber World, Marathon Oil's Answer to Carbon Black: Coal, Jul., 1969, pp. 64–66.

Bureau of Mines Report of Investigations No. 7302, Destructive Distillation of Scrap Tires, Sep. 1969.

Chem. Engineering, More Mileage From Old Tires, Oct. 20. 1969, pp. 58–60.

*Primary Examiner*—James Poer
*Attorney, Agent, or Firm*—Jesse B. Grove, Jr.

[57] ABSTRACT

Char obtained by the destructive distillation of scrap rubber vulcanizate is ground in a fluid-energy mill. The resulting black powder, with or without coating with oil, is used as a reinforcing agent for vulcanized rubbers.

19 Claims, No Drawings

RUBBER-REINFORCING BLACKS

The invention relates to new rubber-reinforcing agents.

The new rubber-reinforcing agents of this invention are produced from char obtained by the destructive distillation of scrap rubber vulcanizate. The char obtained is ground in a fluid-energy mill to produce a powder. This powder may be used without further treatment as a rubber-reinforcing agent. Alternatively, it may be coated with oil to provide a dustless product with increased bulk density or for some other purpose, and as set forth herein it has been proposed to use this oil-coated black as a rubber-reinforcing agent. Both the oil-coated and the non-oil-coated ground char black may be pelletized to facilitate handling in rubber manufacturing operations. The pelletization operation is well known in the carton black industry.

Many rubber products are composed of rubber vulcanizate reinforced with carbon black. The vulcanizates are used in mats of many kinds, solid rubber tires, gaskets, conveyor belts, boots, pneumatic tires, etc. The char blacks of this invention have been found useful for the reinforcement of rubber used in pneumatic tires, and may be used in the reinforcement of rubbers employed in other ways, including the broad field known in the industry as "mechanical goods."

The char obtained by the destructive distillation of rubber vulcanizate is different from other chars. It is composed largely of recovered carbon; that is, carbon black which was compounded with the rubber prior to vulcanization. It contains a minor amount of ash derived from metal compounds such as zinc oxide, titanium dioxide, etc. used in compounding the rubber, and may include other residues such as glass, sulfur and nitrogen compounds, etc. derived from the compounding ingredients.

Thus, highly reinforcing SAF (Super Abrasion Furnace, ASTM designation N-110) is composed of particles in the range of 20 millimicrons whereas GPF (General Purpose Furnace, ASTM designation N-660) contains particles in the range of 60 millimicrons. Thermal carbon blacks such as MT (Medium Thermal, ASTM designation N-990) are considerably larger in size; generally in the range of 300 millimicrons. Sea coal or Austin black is larger than even the thermal carbon blacks.

Generally the finer size carbon blacks are used in vulcanizates requiring abrasion resistance such as in tire treads. The larger size carbon blacks are used in mechanical goods where high abrasion resistance is not extremely critical. Austin black or sea coal finds industrial application as fillers in mechanical goods.

Generally the size of char black prepared by grinding in a fluid-energy mill is in the range of 10 to 5000 millimicrons. Although this size-range is larger than high reinforcing commercial carbon blacks, the ground char black would be acceptable for reinforcing the bodies of pneumatic tires or vulcanizates used for mechanical goods.

Gotshall U.S. Pat. No. 3,644,131 describes the production and use of a reinforcing black derived from the pyrolysis of scrap rubber, and makes this claim:

The process for the preparation of reinforcing fillers suitable for use in elastomeric compositions comprising in combination, the steps of:

a. destructively distilling scrap polymeric compositions at from about 800° to about 2,800° F. to produce carbonaceous char, gases and liquids, b. grinding said carbonaceous char to an average particle size of less than about 2.5 microns and at least 99 percent by weight less than 5 microns under a nonoxidizing atmosphere at a temperature of from about 350° to about 800° F., c. coating the individual particles of said ground carbonaceous char with an organic liquid barrier having a Saybolt Universal viscosity of from about 10 to about 75 seconds at 100° F., said particles being maintained under a nonoxidizing atmosphere until they are substantially completely coated with said organic liquid.

Gotshall also claims the resulting black in this claim:

A Carbonaceous pulverized material suitable for incorporation in elastomeric compositions consisting essentially of ground carbonaceous particles derived from destructive distillation of scrap rubber and having an average particle size of 2.5 microns and 99 percent by weight below 5 microns, each of said particles being substantially completely coated with an organic liquid barrier having a Saybolt Universal viscosity of from 10 to about 75 seconds at 100° F. and boiling above 300° F.

The claims are quoted as describing a process and product representative of what are claimed herein. We quote further from the Gotshall patent to incorporate further matter as a part of this patent disclosure as follows:

"Scrap tires are placed into the retort or furnace and heated to temperatures of from about 800° to about 2,800° F . . . " (Column 2, lines 58–59.)

"The classifier is operated to provide an average particle size (by weight) of less than about 2.5 microns with 99 percent by weight of the product having particle size of less than 5 microns." (Column 3, lines 1–4.)

"The autogenous grinding mill is conventionally operated, preferably at temperatures from about 350° to about 800° F." (Column 2, lines 73–75.)

"In general, the barrier liquids should have a viscosity from about 10 to 75 Saybolt seconds universal (SSU) at 100° F . . . The liquid will preferably have an initial boiling point of above 300° F." (Column 2, lines 27–31.)

". . . rubber compositions will generally contain substantial amounts (e.g. perhaps 25 percent by weight average) of carbon black." (Column 2, lines 3–5.)

"An elastomer composition comprising from 25 percent to about 400 percent by weight of" scrap rubber char. (Claim 5.)

"The coating step can be accomplished by feeding the organic liquid and the particles into a dry blender, a ribbon blender . . . and intimately admixing the two ingredients so as to coat substantially all of the individual particles with barrier liquid." (Column 3, lines 11–16.)

"The organic liquids utilized to coat the individual particles of char and to act as barriers to prevent oxygenation of the surface are preferably aromatic hydrocarbons, and most probably heavy oils derived from the destructive distillation step", i.e. the destructive distillation of scrap polymeric compositions including rubber. "Light catalytic cycle oil . . . may also be employed as barrier liquids" with a boiling point "more preferably above 400° F." (Column 2, lines 21–32.)

"The process of claim 1 wherein the organic liquid comprises catalytic cycle oil having an initial boiling point of 400° F." (Claim 10.)

The entire Gotshall patent is included herein by reference.

There are many articles describing the destructive distillation of rubbers. For instance, we refer to an article entitled DISTILLATION DESTRUCTIVE DU CAOUTCHOUC VULCANIZE, No. 174 Le-CAOUTCHOUC et la GUTTA-PERCHA, pages 9569–9572, Aug. 15, 1958; 66 Chemical Abstracts, pages 7314–7315, 77892n, (1967); U.S. Department of Interior, Bureau of Mines, Report of Investigations 7302 (Sept. 1969); TIRE BY-PRODUCT RECOVERY, Chemical and Engineering News, Apr. 5, 1971, page 31; and TIRES: DISPOSAL PROBLEM SOLVED, Chemical and Engineering News, June 8, 1970, page 12. Wyatt U.S. Pat. No. 3,674,433 describes the production of carbon black by spraying in a carbon-black furnace scrap rubber black dissolved in oil. "THE DESTRUCTIVE DISTILLATION OF USED TIRES IN A CONTINUOUS PILOT PLANT" was presented by personnel of The Firestone Tire & Rubber Company at the Akron Rubber Group Apr. 21, 1972, meeting, as well as before the Virginia Academy of Science meeting in Lexington, Virginia, May 4, 1972. We also refer to an article on pages 64–66 of RUBBER WORLD for July 1969 entitled MARATHON OIL'S ANSWER TO CARBON BLACK: COAL.

At the present time scrap rubber is composed largely of synthetic rubber vulcanizates, including the vulcanizates of polybutadiene, polyisoprene, butadiene-styrene copolymer, butadiene-acrylonitrile copolymer, butyl rubber, neoprene, ethylene-propylene copolymers and terpolymers, etc., as well as natural rubber vulcanizate. The char obtained by destructive distillation preferably contains no more than about 0.1 to 6 percent, preferably 0.1 to 1.0 percent of volatile matter and includes approximately 10 percent mineral ash. The ash consists of zinc, titanium, magnesium and calcium oxides as well as silicon dioxide. The relative proportions of the oxides will vary according to the nature of the scrap rubber pyrolyzed. The unground char contains a minor amount of combined sulfur, in the order of 1 to 3 percent and lower amounts of combined nitrogen in the order of 0.1 to 0.5 percent. The combined sulfur is derived from the sulfur used in the vulcanization process; the combined nitrogen could be derived from the antioxidants or antiozonants compounded in the vulcanizate or it may be derived from the tire cord such as nylon, used to construct pneumatic tires.

The carbon content of the char may range from 80 to 90 weight percent or in the wider range disclosed by Gotshall, and is believed to result from the recovery of carbon black used in the preparation of the rubber vulcanizates that are pyrolyzed.

The size of the ground particles influences the usefulness of the product as a rubber reinforcing agent. Patent application Ser. No. 769,571 filed Oct. 22, 1968, now abandoned, of which I am a co-applicant, describes the milling of scrap-rubber char to produce particles measuring, for example, about 10 to 250 millimicrons, for the reinforcement of rubber. We were unable to obtain black particles of this extreme fineness in a ball mill.

The subject matter of said application Ser. No. 769,571 relating to the use of the milled scrap-rubber char as a reinforcing agent for rubber was carried forward in continuation and divisional applications resulting in the issuance of U.S. Pat. Nos. 3,772,242 on Nov. 13, 1973 and 3,823,223 on July 9, 1974.

The effectiveness of the ground char as a reinforcing agent depends upon the size of the char particles. The following table shows this, although the rubbers and the compounding formulae used, differ.

|  | RUN A | RUN B | RUN C | RUN D | RUN E | RUN F | RUN G | RUN H | RUN I | RUN J | RUN K |
|---|---|---|---|---|---|---|---|---|---|---|---|
| SBR (Emulsion) | 100 | 100 | 100 | 100 |  |  |  | 100 | 100 | 100 | 100 |
| NR Natural Rubber |  |  |  |  | 100 | 100 | 100 |  |  |  |  |
| HAF | 40 |  |  |  | 50 |  |  |  |  |  |  |
| SRF |  | 40 |  |  |  |  |  | 40 |  |  |  |
| A CHAR |  |  | 40 |  |  |  |  |  |  |  |  |
| B CHAR |  |  |  | 40 |  | 50 |  |  |  |  |  |
| C CHAR |  |  |  |  |  |  | 50 |  |  |  | 40 |
| D CHAR |  |  |  |  |  |  |  |  | 40 |  |  |
| E CHAR |  |  |  |  |  |  |  |  |  | 40 |  |
| ZnO | 5 | 5 | 5 | 5 | 5 | 5 | 5 | 3 | 3 | 3 | 3 |
| S |  |  |  |  | 2.5 | 2.5 | 2.5 | 1.75 | 1.75 | 1.75 | 1.75 |
| $MgCO_3$ | 2 | 2 | 2 | 2 |  |  |  |  |  |  |  |
| Stearic Acid |  |  |  |  | 3 | 3 | 3 | 1 | 1 | 1 | 1 |
| Benzothiazyl Disulfide | 2 | 2 | 2 | 2 | 0.6 | 0.6 | 0.6 |  |  |  |  |
| Santocure NS |  |  |  |  |  |  |  | 1.25 | 1.25 | 1.25 | 1.25 |
| Cured at °F. | 293 | 293 | 293 | 293 | 293 | 293 | 293 | 300 | 300 | 300 | 300 |
| 300% Modulus, psi |  |  |  |  |  |  |  |  |  |  |  |
| 15' |  |  |  |  | 1225 | 875 | 550 |  | 275 | 200 | 100 |
| 23' |  |  |  |  |  |  |  | 675 | 800 | 675 | 300 |
| 25' | 1550 | 900 | 450 | 625 |  |  |  |  |  |  |  |
| 30' |  |  |  |  | 1875 | 950 | 650 | 1050 | 1050 | 875 | 300 |
| 45' |  |  |  |  | 2125 | 1000 | 675 |  |  |  |  |
| 50' | 2125 | 1325 | 775 | 775 |  |  |  |  |  |  |  |

|  | RUN A | RUN B | RUN C | RUN D | RUN E | RUN F | RUN G | RUN H | RUN I | RUN J | RUN K |
|---|---|---|---|---|---|---|---|---|---|---|---|
| 100' | 2700 | 1575 | 1000 | 825 | | | | | | | |
| Tensile Strength, psi | | | | | | | | | | | |
| 15' | | | | | 3400 | 1925 | 850 | N/C | 1200 | 1050 | 200 |
| 23' | | | | | | | | 2550 | 1800 | 1825 | 300 |
| 25' | 3250 | 2475 | 1725 | 875 | | | | | | | |
| 30' | | | | | 3875 | 1950 | 900 | 2100 | 1400 | 1675 | 300 |
| 45' | | | | | 3825 | 1850 | 850 | | | | |
| 50' | 3125 | 2125 | 1775 | 825 | | | | | | | |
| 100' | 2875 | 1900 | 1700 | 825 | | | | | | | |
| Ultimate Elongation, % | | | | | | | | | | | |
| 15' | | | | | 545 | 490 | 410 | N/C | 790 | 890 | 540 |
| 23' | | | | | | | | 680 | 480 | 550 | 350 |
| 25' | 480 | 610 | 785 | 530 | | | | | | | |
| 30' | | | | | 490 | 470 | 400 | 470 | 350 | 430 | 300 |
| 45' | | | | | 460 | 450 | 375 | | | | |
| 50' | 395 | 420 | 530 | 350 | | | | | | | |
| 100' | 310 | 360 | 425 | 390 | | | | | | | |

Referring to the table:

| Rubbers: | |
|---|---|
| SBR | = Emulsion-polymerized styrene-butadiene copolymer |
| NR | = Natural rubber |
| Blacks: | |
| HAF | = High abrasion furnace black |
| SRF | = Semi-Reinforcing furnace black |
| A char | = Scrap-rubber char (100% through 270-mesh screen) |
| B char | = Scrap-rubber char (100% through 270-mesh screen) |
| C char | = Scrap-rubber char (100% through 50-mesh screen) |
| D char | = Uncoated char of this invention (Fluid-Energy-Mill ground) |
| E char | = Oil-coated char of this invention (Fluid-Energy-Mill ground) |
| Santocure NS | = N-t-butyl-2-benzothiazolesulfenamide |

A char, B char and C char were obtained by ball milling. D char and E char were obtained by finely grinding char (Fluid-Energy Mill) obtained by destructive distillation of scrap rubber at 900° C. in a sealed retort. E char was coated with 4 percent of an aromatic oil. This oil is representative of what may be used. The kind of oil and amount, as given, are merely representative. Any air-excluding oil may be employed and the amount may vary from 2 to 6 percent or more, and preferably about 4 percent. The purpose of oil coating was to exclude the air. Run I prepared with non-oil-coated char black had slightly higher modulus values but a lower 30-minute tensile value than Run J which was prepared with oil-coated char black. The differences in the stress/strain properties of the vulcanizates of Runs I and J are not large and indicate that oil-coating of ground char black has no significant effect on the reinforcing properties of the ground char black. However, coating of the ground char black with oil does increase the bulk density of the char black as well as decrease the tendency of the ground char to form dust particles. A higher bulk density char black as well as a dustless-product is very desirable in factory operations.

D char and E char are representative of any finely ground char obtained by the destructive distillation of scrap rubber and ground in the substantial absence of air. Both D char and E char were obtained by grinding in a fluid-energy mill using steam as the fluid. The product contained particles, varying in particle size, including particles ranging from a minimum of 10 to 1000 millimicrons in the largest dimension. It included larger particles measuring in the range of 1000 to 5000 millimicrons. Commercially, particles ranging from about 10 to 500 millimicrons in the largest dimension will ordinarily be preferred. The particle size depends on exact operating conditions of the mill. A Model 30-10 mill manufactured by Majac, Inc. of Sharpsburg, Pa. is satisfactory. There is a disclosure of this type of mill on pages 8-43 and 8-44 of CHEMICAL ENGINEERS HANDBOOK by John H. Perry, 4th Edition, McGraw-Hill, 1963. The fluids which may be used include nitrogen and other inert gases. Satisfactory temperatures for use in a fluid-energy mill are given in Gotshall U.S. Pat. No. 3,644,131. The oil coating was applied as a spray in a ribbon-type blender subsequent to the grinding. Other suitable types of blenders may be used.

The char may be produced as either a batch or a continuous operation, in a vertical retort or horizontal retort, and in the latter case the distillate and gases may be removed by concurrent or countercurrent flow. It may be first ground to a coarse powder and then ground to the fine particle size to which this invention relates.

In the destructive distillation of scrap rubber the oil content of the product will depend upon the temperature and time that the scrap is in the retort. Generally the temperature of the retort may be 800° F. to 3000° F., but because of temperature limitations of commercial calciners the practical operating temperatures are in the range of 800° F. to 1800° F. At the lower temperature, the residence time of the scrap rubber may be increased to effect pyrolysis; on the other hand, a shorter residence time may be used if a higher calcining temperature is employed.

The finely ground char need not be coated. It may be subjected to various refining treatments. Substantially all of the oil is removed in the destructive distillation. If the scrap is obtained from pneumatic tires, they are de-beaded before being destructively distilled, and the fabric may or may not be first separated from the rubber.

Run I gives data on the physical properties of SBR rubber reinforced with an uncoated finely ground char of this invention, and Run J gives data on SBR rubber reinforced with an oil-coated finely ground char of this invention. The amount of the char used in any formulation will vary with the type of rubber which is reinforced and the use to which it is put.

I claim:

1. A process for the preparation of reinforcing fillers suitable for use in elastomeric compositions comprising in combination, the steps of:
   a. destructively distilling scrap polymeric compositions at from about 800° F. to about 2,800° F. to produce carbonaceous char, gases and liquids,
   b. grinding said carbonaceous char in a fluid energy mill to an average particle size of less than about 2.5 microns and at least 99 percent by weight less than 5 microns under a nonoxidizing atmosphere at a temperature of from about 350° F. to about 800° F.,
   c. coating the individual particles of said ground carbonaceous char with an organic liquid barrier having a Saybolt Universal viscosity of from about 10 to about 75 seconds at 100° F., said particles being maintained under a nonoxidizing atmosphere until they are substantially completely coated with said organic liquid.

2. The process of claim 1 wherein the scrap polymeric composition is scrap containing carbon reinforcing material.

3. The process of claim 1 wherein the organic liquid comprises liquid products from said destructive distillation.

4. A carbonaceous pulverized material produced by the process of claim 1 suitable for incorporation in elastomeric compositions consisting essentially of ground carbonaceous particles derived from destructive distillation of scrap rubber and having an average particle size of less than about 2.5 microns and 99 percent by weight below 5 microns, each of said particles being substantially completely coated with an organic liquid barrier having a Saybolt Universal viscosity of from 10 to about 75 seconds at 100° F. and boiling above 300° F.

5. An elastomeric composition comprising from 25 percent to about 400 percent by weight of the product of claim 4.

6. The process of claim 1 wherein the organic liquid comprises liquid hydrocarbons.

7. The process of claim 4 wherein the organic liquid comprises liquid hydrocarbons.

8. The process of claim 1 wherein the organic liquid comprises aromatic hydrocarbons.

9. The process of claim 4 wherein the organic liquid comprises aromatic hydrocarbons.

10. The process of claim 1 wherein the organic liquid comprises catalytic cycle oil having an initial boiling point of about 400° F.

11. A process for the preparation of reinforcing fillers suitable for use in elastomeric compositions comprising in combination, the steps of:
    a. destructively distilling scrap polymeric compositions at from about 800° F. to about 2,800° F. to produce carbonaceous char, gases and liquids, and
    b. grinding said carbonaceous char in a fluid energy mill to an average particle size of less than about 2.5 microns and at least 99 percent by weight less than 5 microns under a nonoxidizing atmosphere at a temperature of from about 350° F. to about 800° F.

12. The process of claim 11 wherein the scrap polymeric composition is scrap containing carbon reinforcing material.

13. A carbonaceous pulverized material suitable for incorporation in elastomeric compositions produced by the process of claim 11.

14. An elastomeric composition comprising from 25 percent to about 400 percent by weight of the product of claim 13.

15. Fluid-energy-mill-ground vulcanized-rubber char produced by the process of claim 11 composed essentially of particles measuring 10 to 5000 millimicrons in the largest dimension with some particles being in the 10 to 1000 millimicron range and some particles being in the 1000 to 5000 millimicron range.

16. Pellets of particles of claim 4.

17. Pellets of particles of claim 13.

18. Vulcanized rubber reinforced with particles of claim 4.

19. Vulcanized rubber reinforced with particles of claim 15.

* * * * *